(12) United States Patent
Barrow et al.

(10) Patent No.: US 7,433,977 B2
(45) Date of Patent: Oct. 7, 2008

(54) DMAC TO HANDLE TRANSFERS OF UNKNOWN LENGTHS

(75) Inventors: David E. Barrow, Durham, NC (US); Clarence V. Roberts, Raleigh, NC (US)

(73) Assignee: Telefonaktiebolaget LM Ericsson (publ) (SE)

(*) Notice: Subject to any disclaimer, the term of this patent is extended or adjusted under 35 U.S.C. 154(b) by 136 days.

(21) Appl. No.: 11/563,732

(22) Filed: Nov. 28, 2006

(65) Prior Publication Data

US 2008/0126612 A1 May 29, 2008

(51) Int. Cl.
G06F 13/28 (2006.01)
G06F 13/00 (2006.01)

(52) U.S. Cl. .............. 710/22; 710/34; 710/308

(58) Field of Classification Search ......... 710/22–35, 710/308–310
See application file for complete search history.

(56) References Cited

U.S. PATENT DOCUMENTS

| 4,942,515 | A | | 7/1990 | Marzucco et al. |
| 5,151,999 | A | | 9/1992 | Marzucco et al. |
| 5,333,294 | A | * | 7/1994 | Schnell ................. 710/26 |
| 5,568,614 | A | | 10/1996 | Mendelson et al. |
| 5,761,453 | A | * | 6/1998 | Anderson et al. ........... 710/308 |
| 5,828,856 | A | * | 10/1998 | Bowes et al. ............. 710/308 |
| 6,154,793 | A | * | 11/2000 | MacKenna et al. ........... 710/23 |
| 6,199,121 | B1 | * | 3/2001 | Olson et al. ............... 710/24 |
| 6,230,215 | B1 | * | 5/2001 | Fadavi-Ardekani et al. ..... 710/1 |
| 6,253,261 | B1 | | 6/2001 | Murphy |
| 6,622,183 | B1 | * | 9/2003 | Holm ........................ 710/34 |
| 6,629,164 | B1 | | 9/2003 | Rustad et al. |
| 2002/0026544 | A1 | * | 2/2002 | Miura ....................... 710/25 |
| 2003/0070011 | A1 | * | 4/2003 | Naruse et al. .............. 710/52 |
| 2003/0088718 | A1 | | 5/2003 | Higuchi |

FOREIGN PATENT DOCUMENTS

| EP | 0 422 776 A2 | 4/1991 |
| EP | 1 111 512 | 6/2001 |
| JP | 63293657 | 11/1988 |
| JP | 63293658 | 11/1998 |

OTHER PUBLICATIONS

Qiao, Lufeng and Wang, Zhigong, "Design of DMA Controller for Multichannel PCI Bus Frame Engine and Data Link Manager." Conference on Communications, Circuits and Systems and West Sino Expositions, IEEE 2002 International, Jun. 2002, pp. 1481-1485, vol. 2.
Co-pending U.S. Appl. No. 11/751,109, filed May 21, 2007.

* cited by examiner

*Primary Examiner*—Christopher B. Shin
(74) *Attorney, Agent, or Firm*—Coats & Bennett, P.L.L.C.

(57) ABSTRACT

A DMA controller maintains a count of data transferred in each DMA operation, and saves the transferred data count at the end of the DMA operation. The DMA controller may then begin a subsequent DMA transfer operation, without waiting for a processor to read the transferred data count. The transferred data count may be written to memory at an address specified in a transferred data count save address register; may be saved to a transferred data count register dedicated to the DMA channel; or may be saved to a transferred data count register shared between two or more DMA channels. The processor may read the transferred data count and, if applicable, clear the relevant transfer data count register, subsequent to the DMA controller beginning another DMA operation on that DMA channel.

22 Claims, 3 Drawing Sheets

DMAC TO HANDLE TRANSFERS OF UNKNOWN LENGTHS

BACKGROUND

The present invention relates to data processing circuits, and in particular to a Direct Memory Access (DMA) controller operative to maintain and store a transfer count.

DMA operations are well known in the art. A DMA controller operates to offload routine data transfer tasks from a processor or other system controller. In an exemplary DMA transfer operation, a processor initializes the DMA controller with source and target information, control information, and a transfer size. The DMA controller autonomously reads data from the source, which may comprise a peripheral, such as a communication interface, or a memory location, and writes the data to the target, which may also comprise a peripheral or memory. Accordingly, the DMA transfer may be from a peripheral to a peripheral, peripheral to memory, memory to peripheral, or memory to memory. The DMA controller typically stores the transfer size in a counter, and decrements it upon writing each datum (e.g., byte, halfword, etc.). When the transfer size has decremented to zero, the DMA transfer operation is complete, and the DMA controller may interrupt the processor, set a flag in a status or control register, or otherwise indicate completion of the data transfer. A multi-channel DMA controller performs two or more DMA transfer operations in parallel, typically by time-division multiplexing the DMA transfers.

DMA transfer operations may be linked. For example, a very large data transfer may be broken into a sequence of smaller transfers. The DMA controller may be initialized with source, target, transfer size, and other control information, and may additionally be provided a linking address. When the DMA controller completes the DMA transfer, it reads a new set of source, target, transfer size, and control information from the linking address, as well as a new linking address, and immediately begins a new DMA transfer operation. In this manner, a large number of DMA transfer operations may be linked, or chained, together to move large amounts of data.

In many cases, the length of a DMA transfer is not known in advance. For example, a DMA transfer from a communication peripheral to memory may transfer one or more packets, whose length is not known prior to receipt at the peripheral. Additionally, DMA transfers of a nominally known length may terminate prematurely, such as if a peripheral times out, or if a destination buffer fills. In either case, software needs to ascertain the amount of data transferred to be able to process the data. In conventional DMA controllers, the transfer count (either incremented from zero or decremented from a nominal transfer count) must be read by the processor prior to the DMA controller beginning a subsequent DMA transfer, which will overwrite the DMA transfer count register or counter.

Even if the DMA controller interrupts the processor when the DMA transfer operation terminates, the context switch required for the processor to halt execution, load an interrupt service routine, and read the DMA transfer count—thus releasing the DMA controller to perform a subsequent DMA transfer operation—requires a large and in many cases unacceptable delay. As computing systems increase in functionality and complexity, the number of peripherals sharing data, the amount of data to be transferred, and system data rates all increase, reducing the maximum acceptable delay between DMA transfer operations. Accordingly, a need exists in the art to "decouple" the processor from the DMA controller in the case of DMA transfers of unknown size.

SUMMARY

According to one or more embodiments, a DMA controller maintains a count of data transferred in each DMA operation, and saves the transferred data count at the end of the DMA operation. The DMA controller may then begin a subsequent DMA transfer operation, without waiting for a processor to read the transferred data count. The transferred data count may be written to memory at an address specified in a transferred data count save address register; may be saved to a transferred data count register dedicated to the DMA channel; or may be saved to a transferred data count register shared between two or more DMA channels. The processor may read the transferred data count and, if applicable, clear the relevant transferred data count register, subsequent to the DMA controller beginning another DMA operation on that DMA channel.

In one embodiment, the present invention relates to a method of decoupling DMA operations from a processor, by a DMA controller having one or more channels. For at least one DMA channel, a first DMA transfer is executed and a count of the data transferred is maintained. The count of transferred data is stored. Execution of a second DMA transfer is begun prior to the processor reading the stored count of transferred data.

In another embodiment, the present invention relates to a DMA controller supporting one or more DMA channels. The DMA controller includes a set of registers associated with each DMA channel, the set including at least one counter operative to maintain a count of data transferred in each DMA operation. The DMA controller also includes a control circuit operative to save the transferred data count following each DMA operation, and further operative to begin a subsequent DMA operation prior to a processor reading the saved transferred data count.

In yet another embodiment, the present invention relates to a data processing system. The system includes a processor, memory, and a DMA controller supporting one or more DMA channels. The system also includes a register set in the DMA controller associated with each DMA channel, the set including at least one counter operative to maintain a count of data transferred in each DMA operation. The system further includes a control circuit in the DMA controller operative to save the transferred data count following each DMA operation, and further operative to begin a subsequent DMA operation prior to the processor reading the saved transferred data count.

DETAILED DESCRIPTION

Figure 1:
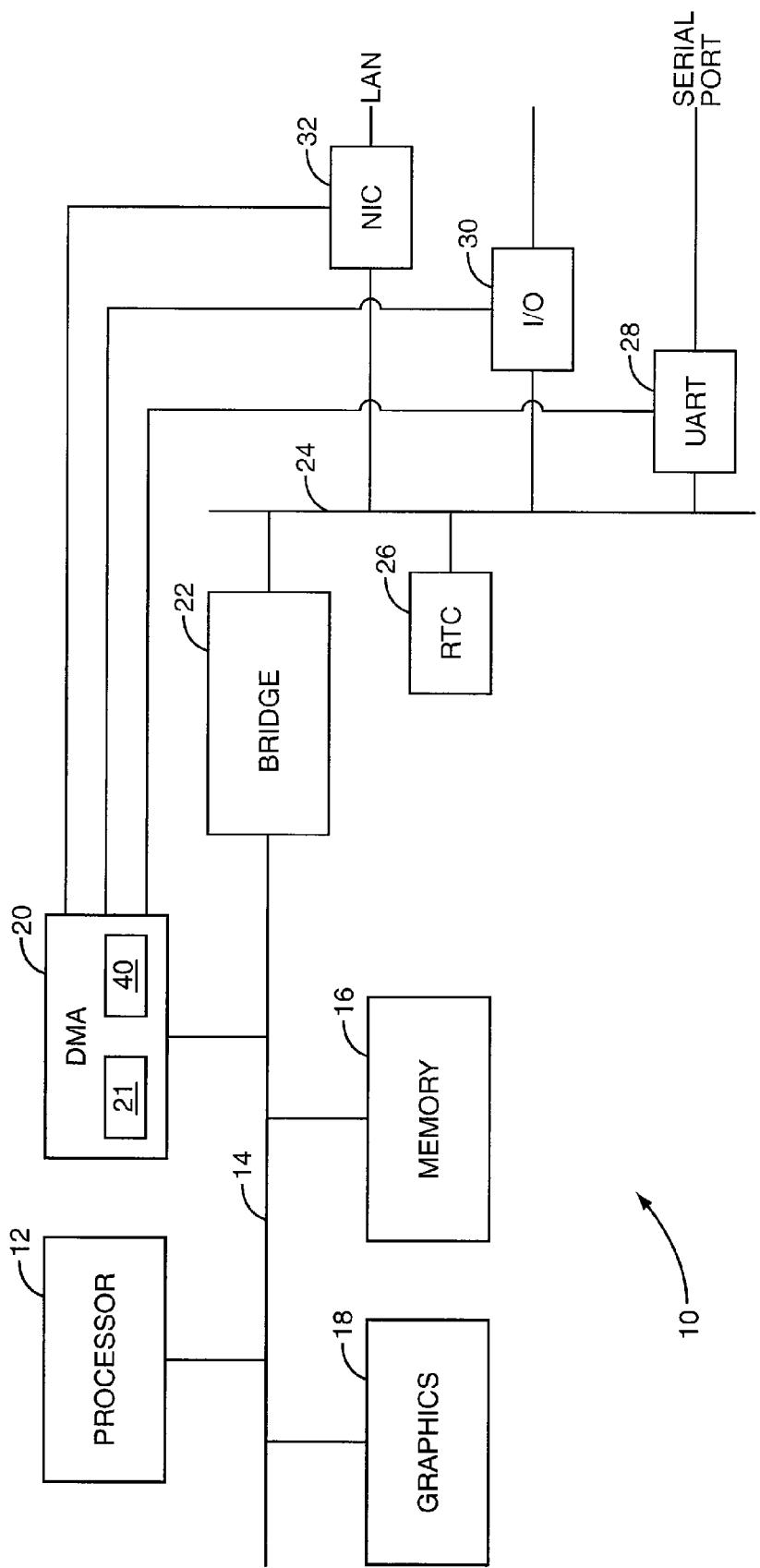
FIG. 1 is a functional block diagram of a data processing system.

FIG. 1 depicts a functional block diagram of a representative data processing system, indicated generally by the numeral 10. The system 10 includes a processor 12, or other controller such as a Digital Signal Processor (DSP), embedded microcontroller, state machine implemented in an ASIC or FPGA, or the like. The processor 12 is connected to a high-speed bus 14, and transfers data across the high-speed bus to and from memory 16. Other system 10 components with high-bandwidth communication to the memory 16, such as a graphics controller 18 and DMA controller 20, are also connected to the high-speed bus 14. The graphics controller 18 may transfer large amounts of data between, e.g., a frame buffer and memory 16, in DMA transfer operations.

A bus bridge 22 provides for data transfer between the high-speed bus 14 and peripheral devices or functions on a peripheral bus 24. Numerous peripherals may be connected to the peripheral bus 24, such as a Real Time Clock (RTC) 26, a Universal Asynchronous Receiver/Transmitter (UART) 28, and Input/Output interface 30, a Network Interface Card (NIC) 32, and the like. Many of these peripherals 28, 30, 32 may transfer data to and from memory 16 and/or between other peripherals 28, 30, 32 via DMA transfer operations. In general, peripherals 28, 30, 32 and components 18 that may participate in DMA transfer operations have sideband control signal connections to the DMA controller 20. Of course, the data processing system 10 of FIG. 1 is representative only. In other embodiments, all functional blocks may share the same bus, not all components may be present, other components may be included, and the like.

Figure 2:
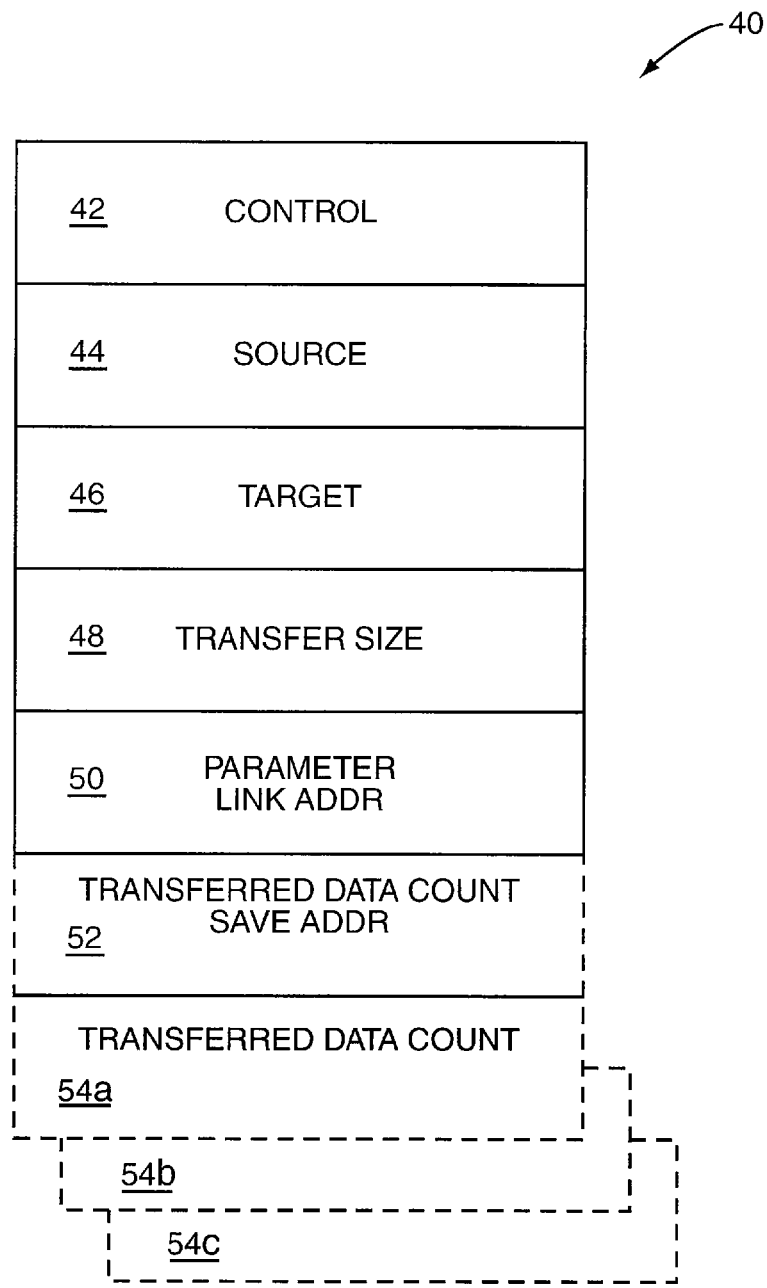
FIG. 2 is a block diagram of a register set associated with each DMA channel.

The DMA controller 20 includes a control circuit 21, which may for example comprise a state machine, and for each DMA channel, a set of registers 40, depicted in detail in FIG. 2. Each register set 40 may include a control register 42, a source register 44, a target register 46, a transfer size register or counter 48, and a parameter link address register 50 if the DMA controller 20 supports linked DMA transfer operations.

The control register 42 contains various predefined bit fields that define the parameters of a DMA transfer operation, such as the size of each datum to be transferred (e.g., byte, halfword, word, etc.), whether the source and/or target address should be incremented following each datum read or write, the priority of this DMA transfer operation relative to other concurrent DMA transfer operations in a multi-channel DMA controller 20, and/or other control information as desired or required for any given implementation.

The source register 44 indicates the peripheral or memory location from which data is to be read, and the target register 46 indicates the peripheral or memory location to which data is to be written. The transfer size register 48 may comprise a counter that is initialized with the desired data transfer count, and is decremented upon successfully reading and writing each datum. Alternatively, for DMA transfer operations of an unknown size, the transfer size register/counter 48 may be initialized to zero, and incremented upon each datum transfer.

If the DMA controller 20 supports linked DMA transfer operations, the parameter link address register 50 contains a starting memory address from which the DMA controller 20 may obtain new values for the register set 42 upon completion of a linked DMA transfer operation. The parameter link address register 50 may also include a valid bit (not shown) to indicate that a linked DMA operation is pending.

The register set 42 is initialized by the processor prior to the DMA transfer operation (or the first DMA transfer operation in a linked sequence of DMA transfer operations). The processor additionally initializes any peripherals participating in the DMA transfer operation. The DMA controller 20 then autonomously performs the DMA transfer operation, reading data from or writing data to peripherals in response to control signals from the peripherals indicating they have data available or the capacity to accept data, respectively, and in response to arbitration for the peripheral bus 24 and the high-speed bus 14. According to one or more embodiments of the present invention, upon completion of the DMA transfer operation, the DMA controller 20 saves a count of data successfully transferred, for later inspection by the processor, and may immediately proceed with a subsequent DMA transfer operation.

In one embodiment, the transferred data count is saved in a transferred data count register 54 that is dedicated to the DMA channel. The transferred data count register 54 may comprise a counter, initialized to zero prior to executing the DMA transfer operation, which is incremented upon the successful transfer of each datum. Alternatively, the transferred data count register 54 may comprise a simple register, to which the contents of the transfer size register/counter 48 are copied upon completion of the DMA transfer operation. Unlike registers 42-50 in the register set 40, the transferred data count register 54 is not overwritten prior to each DMA transfer operation. Rather, the transferred data count register 54 may be cleared by the processor 12 upon reading the transferred data count, or alternatively may be overridden by the DMA controller 20 upon completing a subsequent DMA transfer operation, in response to an indication from the processor 12 that the previous transferred data count has been read. Such indication may, for example, comprise a predetermined state of one or more bits in the control register 42 for the subsequent DMA transfer operation.

In one embodiment, the DMA controller 20 may include a plurality of transferred data count registers 54a, 54b, 54c, each dedicated to the DMA channel, to save the transferred data count of more than one successive DMA transfer operation using that channel. Any desired number n of transferred data count registers 54 may be provided, allowing the DMA controller 20 to execute up to n successive DMA transfer operations per channel without waiting for the processor 12 to read a transferred data count. The number n of transferred data count registers 54 may vary with each DMA channel, and may be determined by a system designer based on known or anticipated levels of DMA transfer activity, processor 12 response time, system 10 latency requirements, and the like. The n transferred data count registers 54 may form a circular queue, with the DMA controller always writing to the next successive transferred data count register 54. Alternatively, the transferred data count registers 54 may include a timestamp field (not shown), with the DMA controller saving a timestamp or sequentially incremented ordinal number with each transferred data count, allowing the processor 12 to associate transferred data counts with DMA transfer operations.

In one embodiment, rather than dedicating the hardware resources of one or more transferred data count registers 54 to each DMA channel, a multi-channel DMA controller 20 may include one or more shared transferred data count registers 54. In this case, each transferred data count register 54 may include a DMA channel identifier field (not shown), so that the processor 12 can unambiguously associate each transferred data count with the corresponding DMA channel. In one embodiment, each shared transferred data count register 54 additionally includes a timestamp field (not shown), allowing the processor 12 to ascertain which of plural transferred data counts associated with a given DMA channel applies to which DMA transfer operation.

In one embodiment, the register set 40 for each DMA channel includes a transferred data count save address register 52. This register 52 is initialized by the processor 12 (or read by the DMA controller 20 in the case of a linked DMA transfer operation) with the address of a memory 16 location to which the DMA controller 20 stores the transferred data count following the DMA transfer operation. This embodiment provides virtually unlimited flexibility in the number of successive DMA transfer operations that the DMA controller 20 may execute without waiting for the processor 12 to read a transferred data count, without the need to implement expensive hardware registers that may seldom or never be utilized. The processor associates each transferred data count save address with the corresponding DMA transfer operation, obviating the need for a DMA channel identifier, timestamp, or other identification.

Figure 3:
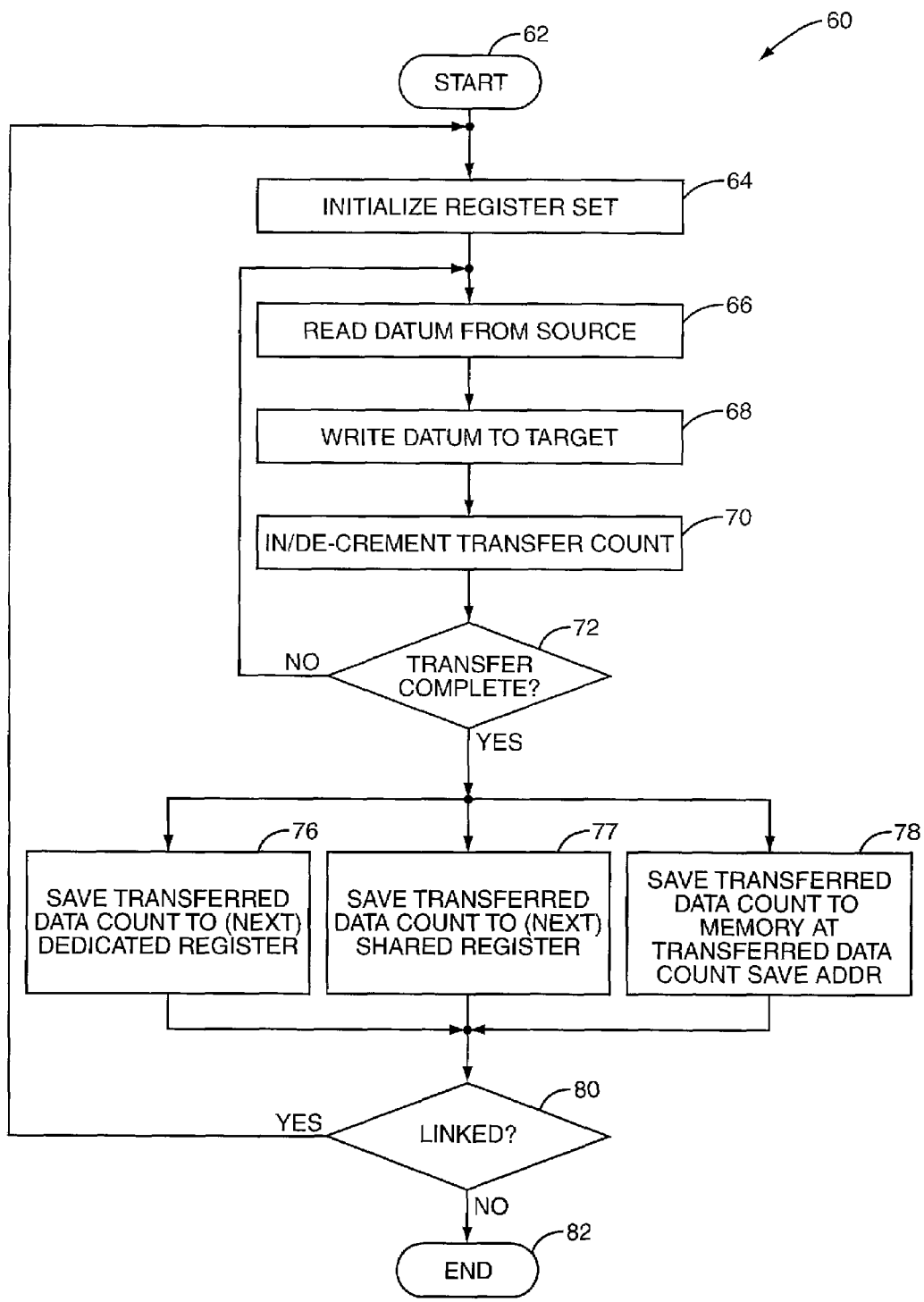
FIG. 3 is a flow diagram of a method of executing DMA operations.

FIG. 3 depicts a method of executing one or more DMA transfer operations, according to various embodiments of the present invention, indicated generally at 60. The method 60 starts at block 62. The register set 40 is initialized (block 64). Initially, the processor 12 writes data to the register set 40. In a linked DMA transfer operation, the DMA controller 20 reads data for the register set 40 from an address specified in the parameter link address register 50 during the previous DMA transfer operation.

The DMA controller 20 reads a datum, as specified in the control register 42, from the source (block 66), as specified in the source register 44. The source may be a peripheral 28, 30, 32, or a location in memory 16. The DMA controller 20 then writes the datum to the target (block 68), as specified in the target register 46. The target may also be a peripheral 28, 30, 32, or a location in memory 16. In either case, the DMA controller 20 may read or write from a single location, such as the output of a FIFO, or may increment its read/write address, as specified in, e.g., the control register 42.

The DMA controller 28 maintains a count of the data transferred in the DMA transfer operation, such as by incrementing or decrementing the transfer size register 48 or other counter (block 70). This process continues until the DMA transfer is complete (block 72). The DMA transfer operation is complete when the quantity of data specified in the transfer size register 48 has been transferred; when the data source indicates to the DMA controller 20 that the transfer is complete (such as via sideband control signals); when the data target indicates to the DMA controller 20 that it cannot accept more data (such as via sideband control signals); or when the DMA controller 20 recognizes an End of File (EOF) flag or other predetermined data pattern indicating the end of a packet, frame, or the like (as may be specified in the control register 42 or other register in the DMA controller 20).

When the DMA transfer operation is complete, the DMA controller 20 saves the transferred data count, so that it does not have to wait for the processor 12 to read the transferred data count prior to beginning a subsequent DMA transfer operation. In one embodiment, the transferred data count is saved to the next available transferred data count register 54a, 54b, ... 54(n-1) dedicated to the DMA channel (block 76). In another embodiment, the DMA controller 20 saves the transferred data count to the next available shared transferred data count register 54a, 54b, ... 54(n-1) (block 77). In another embodiment, the DMA controller 20 writes the transferred data count to memory 16 at an address specified in the transferred data count save address register 52 (block 78).

If the parameter link address register 50 contains a valid address, indicating a linked DMA operation (block 80), the DMA controller 20 reads data from the specified address in memory 16 to initialize the register set 40 (block 64)—but does not overwrite the transferred data count, if saved to a register 54—and proceeds to perform another DMA transfer operation without waiting for the processor 12 to read the transferred data count from the prior DMA transfer operation. If the parameter link address register 50 does not contain a valid address, and the DMA transfer operation is complete, the method 60 ends at block 82.

By decoupling the processor 12 from the DMA transfer operation by saving the transferred count, DMA transfers of unknown size need not halt the system, and the DMA controller 20 need not wait for the processor 12, but rather can immediately begin a subsequent DMA transfer operation. This ability may significantly improve data transfer through the data processing system 10.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of performing Direct Memory Access (DMA) operations with minimal intervention by a processor, by a DMA controller having one or more channels, comprising, for at least one DMA channel:
   executing a first DMA transfer and maintaining a count of the data transferred;
   storing the count of transferred data; and
   beginning execution of a second DMA transfer prior to the processor reading the stored count of transferred data.

2. The method of claim 1 wherein storing the count of transferred data comprises writing the count to a predetermined memory location.

3. The method of claim 2 wherein the predetermined memory location is specified by the processor for each DMA transfer.

4. The method of claim 1 wherein storing the count of transferred data comprises saving the count to a DMA transfer count register in the DMA controller.

5. The method of claim 4 wherein the DMA transfer count register is associated with the DMA channel.

6. The method of claim 5 wherein the DMA transfer count register is one of a plurality of DMA transfer count registers associated with the DMA channel.

7. The method of claim 4 wherein the DMA transfer count register is shared by two or more DMA channels.

8. The method of claim 7 wherein the DMA transfer count register is one of a plurality of DMA transfer count registers shared by two or more DMA channels.

9. A Direct Memory Access (DMA) controller supporting one or more DMA channels, comprising:
   a set of registers associated with each DMA channel, the set including at least one counter operative to maintain a count of data transferred in each DMA operation; and
   a control circuit operative to save the transferred data count following each DMA operation, and further operative to begin a subsequent DMA operation prior to a processor reading the saved transferred data count.

10. The DMA controller of claim 9 wherein each register set further includes a transferred data count save address register, and wherein the control circuit is further operative to write the transferred data count to memory at an address stored in the transferred data count save address register.

11. The DMA controller of claim 9 wherein each register set further includes a transferred data count register that is not overwritten prior to each DMA operation, and wherein the control circuit is operative to save the transferred data count to the transferred data count register.

12. The DMA controller of claim 11 wherein each register set further includes a plurality of transferred data count registers, and wherein the control circuit saves the transferred data count for a plurality of successive DMA operations in the transferred data count registers.

13. The DMA controller of claim 12 wherein the control circuit additionally saves a timestamp with each transferred data count.

14. The DMA controller of claim 9 further comprising a shared transferred data count register that is not overwritten prior to each DMA operation, and wherein the control circuit is operative to save the transferred data count from any DMA channel to the shared transfer data count register.

15. The DMA controller of claim 14 further comprising a plurality of shared transferred data count registers, and wherein the control circuit saves the transferred data count for a plurality of successive DMA operations in the shared transferred data count registers.

16. The DMA controller of claim 15 wherein the control circuit additionally saves a timestamp with each transferred data count.

17. A data processing system, comprising:
a processor;
memory;
a Direct Memory Access (DMA) controller supporting one or more DMA channels;
a set of registers associated with each DMA channel, the set including at least one counter operative to maintain a count of data transferred in each DMA operation; and
a control circuit operative to save the transferred data count following each DMA operation, and further operative to begin a subsequent DMA operation prior to the processor reading the saved transferred data count.

18. The system of claim 17 wherein each register set further includes a transferred data count save address register, and wherein the control circuit is further operative to write the transferred data count to memory at an address stored in the transferred data count save address register.

19. The system of claim 17 wherein each register set further includes a transferred data count register that is not overwritten prior to each DMA operation, and wherein the control circuit is operative to save the transferred data count to the transferred data count register.

20. The system of claim 19 wherein the register set further includes a plurality of transferred data count registers, and wherein the control circuit saves the transferred data count for a plurality of successive DMA operations in the transferred data count registers.

21. The system of claim 17 further comprising a shared transferred data count register that is not overwritten prior to each DMA operation, and wherein the control circuit is operative to save the transferred data count from any DMA channel to the shared transfer data count register.

22. The system of claim 21 further comprising a plurality of shared transferred data count registers, and wherein the control circuit saves the transferred data count for a plurality of successive DMA operations in the shared transferred data count registers.

* * * * *